United States Patent
Lehnich et al.

(10) Patent No.: US 12,368,247 B2
(45) Date of Patent: Jul. 22, 2025

(54) WIRELESS COMMUNICATION NODE AND METHOD FOR CONFIGURING DONOR AND SERVICE ANTENNAS THEREFOR

(71) Applicant: UBICQUIA, INC., Fort Lauderdale, FL (US)

(72) Inventors: Joerg Christian Lehnich, Nehmten (DE); Steve Paul Wines, Marlow (GB); Claudio Santiago Ribeiro, Evanston, IL (US); Elliott Earl Murray, Plantation, FL (US); Gustavo Dario Leizerovich, Aventura, FL (US)

( * ) Notice: Subject to any disclaimer, the term of this patent is extended or adjusted under 35 U.S.C. 154(b) by 276 days.

(21) Appl. No.: 18/142,509

(22) Filed: May 2, 2023

(65) Prior Publication Data

US 2023/0361488 A1    Nov. 9, 2023

Related U.S. Application Data

(60) Provisional application No. 63/338,019, filed on May 3, 2022.

(51) Int. Cl.
*H01Q 21/28* (2006.01)
*H04B 7/06* (2006.01)

(52) U.S. Cl.
CPC ........... *H01Q 21/28* (2013.01); *H04B 7/0617* (2013.01)

(58) Field of Classification Search
CPC .............................. H01Q 21/28; H04B 7/0617
See application file for complete search history.

(56) References Cited

U.S. PATENT DOCUMENTS

| 7,423,985 B1 | 9/2008 | Hill |
| 9,999,038 B2 | 6/2018 | Barzegar et al. |
| | (Continued) | |

FOREIGN PATENT DOCUMENTS

| CN | 113596406 A | 11/2021 |
| EP | 3820242 A1 | 5/2021 |
| | (Continued) | |

OTHER PUBLICATIONS

United States Patent & Trademark Office as International Searching Authority, International Search Report issued in connection with counterpart International Application No. PCT/US2023/020891, Oct. 16, 2023, 4 pages.

(Continued)

*Primary Examiner* — Graham P Smith
(74) *Attorney, Agent, or Firm* — Daniel C. Crilly

(57) ABSTRACT

A wireless communication node employs a method for configuring its donor and service antennas at or after node installation. The antennas are positioned in a predetermined arrangement about a central axis. The node includes the antennas, an actuator, one or more processors, and a memory storing processor-executable instructions for the processor(s). Responsive to the stored instructions, the processor processes wireless signals received by the donor antenna and communicates control signals to the actuator to rotate the donor and service antennas as a group about the central axis. Rotation may be incremental based on whether the donor antenna received an acceptable base station signal at a previous angular displacement increment or may be comprehensive to permit receipt of candidate base station data for a predetermined amount of rotation. After an acceptable base station is identified, the donor antenna's beam pattern may be formed in a direction of the identified base station.

27 Claims, 9 Drawing Sheets

(56) References Cited

U.S. PATENT DOCUMENTS

| | | |
|---|---|---|
| 10,051,497 B1 | 8/2018 | Parihar et al. |
| 10,461,421 B1 | 10/2019 | Tran et al. |
| 10,608,729 B1 | 3/2020 | Youtz et al. |
| 11,101,872 B2 | 8/2021 | Ho |
| 2004/0240417 A1 | 12/2004 | Kim |
| 2010/0141527 A1 | 6/2010 | Lalezari |
| 2010/0296439 A1 | 11/2010 | Leung et al. |
| 2012/0027054 A1 | 2/2012 | Palanki et al. |
| 2015/0295310 A1 | 10/2015 | Hazelton et al. |
| 2018/0198515 A1 | 7/2018 | Lotter |
| 2018/0351605 A1 | 12/2018 | Liang et al. |
| 2020/0052775 A1 | 2/2020 | Nam et al. |
| 2021/0013616 A1 | 1/2021 | Oonishi et al. |
| 2021/0066818 A1 | 3/2021 | Flores-Cuadras |
| 2021/0153277 A1 | 5/2021 | Raghavan et al. |
| 2022/0158671 A1 | 5/2022 | Anderson et al. |
| 2023/0119096 A1 | 4/2023 | Yang et al. |

FOREIGN PATENT DOCUMENTS

| | | |
|---|---|---|
| KR | 102137623 B1 | 7/2020 |
| WO | 2020162817 A1 | 8/2020 |
| WO | 2021081431 A1 | 4/2021 |

OTHER PUBLICATIONS

United States Patent & Trademark Office as International Searching Authority, Written Opinion of the International Searching Authority issued in connection with counterpart International Application No. PCT/US2023/020891, Oct. 16, 2023, 8 pages.

WIRELESS COMMUNICATION NODE AND METHOD FOR CONFIGURING DONOR AND SERVICE ANTENNAS THEREFOR

CROSS-REFERENCE TO RELATED APPLICATIONS

The present application claims the benefit of and priority upon U.S. Provisional Patent Application No. 63/338,019, which was filed on May 3, 2022.

TECHNICAL FIELD

The present disclosure relates generally to antennas and antenna selection schemes. More particularly, but not exclusively, the present disclosure relates to a wireless communication node, such as a repeater, and a method for configuring donor and service antennas for such a node.

BACKGROUND

Successful deployment of 5G systems utilizing new 5G millimeter wave (mmWave) bands are complex, having multiple input, multiple output (MIMO) antennas or other antenna structures and employing emerging standards, such as, millimeter wave or C-band 5G, which require additional improvements in performance parameters. Millimeter wave 5G systems may also require more base stations due to high propagation losses of mmWave signals, especially in urban and other settings. However, the costs for deploying base stations to increase coverage and capacity of mmWave 5G networks in urban settings can be substantial when factoring in the costs of equipment, new poles, site acquisition, acquiring utility power, and running fiber backhaul for such installations. Therefore, a more cost-effective solution is needed for densification of mmWave 5G and other generally line of sight communication systems.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

According to one exemplary embodiment, a wireless communication node includes, inter alia, donor and service antennas, an actuator (e.g., a rotary actuator, such as a servo, stepper, induction, or other type of motor), one or more processors, and a memory. The donor and service antennas may be implemented as phased array antennas, each with an array of electronically controllable antenna elements. The donor and service antennas are positioned in a predetermined arrangement about a central axis, which may be a central axis of a support structure to which the antennas are coupled. Each donor antenna is operable to communicate wireless signals with (e.g., transmit wireless signals to and receive wireless signals from) a base station after the base station (e.g., a 5G gNodeB or gNB) has been discovered by the wireless communication node. Each service antenna is operable to communicate wireless signals in one or more service or coverage areas (e.g., transmit signals to and receive signals from mobile devices, tablet computers, wireless routers, or other user equipment located in the service area or areas). In one exemplary embodiment, the wireless communication node is aerially mountable, such as to a streetlight, pole, or other structure. In another exemplary embodiment, the wireless communication node may function as an infrastructure component, such as a repeater, a relay node, a small cell node, an access point, a gateway, or a router of a wireless communication system (e.g., a mmWave or C-band 5G system) or as an integrated access and backhaul (IAB) node in a 5G IAB network. In a further exemplary embodiment, the wireless communication node may include four antennas in total, one donor antenna and three service antennas, with each antenna being configured substantially orthogonal to its neighboring antenna to form a generally rectangular arrangement. Such an arrangement serves to improve radio frequency isolation between the antennas. In another exemplary embodiment, the wireless communication node may include three antennas in total, one donor antenna and two service antennas, with each antenna being configured approximately 120-degrees from its neighboring antenna to form a generally triangular arrangement. In other embodiments, two antennas or five or more antennas may be used depending on the quantities and geographies of the coverage areas to be serviced by the service antennas.

The processor(s) is operable to, inter alia, communicate control signals to the actuator and process wireless signals received by at least the donor antenna. For example, the processor may be operably coupled, directly or indirectly, to the actuator and, through conventional wireless transceiver circuitry, to the donor antenna and/or the service antennas. The memory stores instructions (e.g., executable code) for execution by the processor. Such instructions, when executed by the processor, cause the processor to perform various steps or tasks. For example, such instructions may cause the processor to process a first wireless signal received by the donor antenna and determine whether the first wireless signal meets base station discovery criteria to enable discovery of the base station. In the context of the present disclosure, a wireless signal received by the donor antenna meets base station discovery criteria if the wireless signal meets or exceeds the base station discovery criteria. The base station discovery criteria may include one or more of a base station identifier, signal strength or other signal quality criteria (e.g., threshold or level), channel loading criteria, and bandwidth criteria. For example, the base station discovery criteria may include parameters, thresholds, or other criteria for establishing whether the wireless signal received by the donor antenna: (a) is of sufficient quality for decoding by the wireless communication node or user equipment with an acceptable level of accuracy, (b) meets or exceeds a threshold for signal strength, (c) includes a base station identifier, (d) includes data or information from which base station loading can be determined, and/or (e) includes data or information relating to channel frequencies and bandwidths supported by the base station.

When the first wireless signal meets the base station discovery criteria, the stored instructions may cause the processor to provide one or more beam control signals to the donor antenna to cause the donor antenna to form a beam pattern in a direction of the base station. According to the present disclosure, formation of a beam includes any one or more of beamforming, beam steering, spatial filtering, or other known or future developed beam formation techniques. In an exemplary embodiment, the formed beam pattern is sufficient to achieve signal strength above a threshold for subsequent signals received from the base station.

When the first wireless signal does not meet the base station discovery criteria, the stored instructions cause the processor to communicate an actuation control signal to the actuator. The actuator is operable to rotate the donor and service antennas as a group about the central axis in response to actuation control signals from the processor. The first actuation control signal received by the actuator from the processor may cause the actuator to rotate the antennas as a group incrementally clockwise (e.g., to the right) or counterclockwise (e.g., to the left) by an angular displacement relative to the current position of the group of antennas. In one exemplary embodiment, such angular displacement may be between about five and about ten degrees clockwise or counterclockwise relative to the current position of the group of antennas. Where the group of donor and service antennas are coupled to a support structure defining the central axis, the actuator may rotate the support structure about the central axis to thereby rotate the donor and service antennas as a group about the central axis.

After the group of antennas has been collectively rotated by the angular displacement, the stored instructions cause the processor to process a second wireless signal received by the donor antenna and determine whether the second wireless signal meets the base station discovery criteria. When the second wireless signal meets the base station discovery criteria, the stored instructions may cause the processor to provide one or more beam control signals to the donor antenna to cause the donor antenna to form a beam pattern in a direction of the base station. When the second wireless signal does not meet the base station discovery criteria, the stored instructions may cause the processor to communicate a second actuation control signal to the actuator. The second actuation control signal may cause the actuator to rotate the antennas as a group incrementally by another angular displacement, which may be the same angular displacement as was used upon determining that the first wireless signal did not meet the base station discovery criteria or a different angular displacement. For example, where the stored instructions implement a coarse and fine tuning methodology, the angular displacement used after determining that the second wireless signal does not meet the base station discovery criteria may be less than the angular displacement used in response to determining that the first wireless signal did not meet the base station discovery criteria. By contrast, where the stored instructions implement a uniform rotation methodology, the angular displacement used after determining that the second wireless signal does not meet the base station discovery criteria may be substantially the same as the angular displacement used in response to determining that the first wireless signal did not meet the base station discovery criteria. The stored instructions may cause the processor to continue an iterative process-rotate-process approach until a wireless signal is received by the donor antenna that meets the base station discovery criteria.

After the donor antenna has received a wireless signal that meets the base station discovery criteria, the stored instructions may cause the processor to provide one or more beam control signals to the donor antenna to cause the donor antenna to form a beam pattern in a direction of the base station. The stored instructions may also cause the processor to establish a wireless connection with the base station (e.g., where the wireless communication node is a small cell node). Additionally, the stored instructions may cause the processor to provide one or more beam control signals to each service antenna to cause the service antenna to form a respective beam pattern to provide wireless coverage to one or more service area or a respective service area. According to one exemplary embodiment, the beam control signals provided to the donor and service antennas are such that they cause the donor antenna to form a beam pattern with a higher gain and narrower beam width than a gain and beam width of a beam pattern formed by one or more of the service antennas. Accordingly, the beam control signals provided to a donor antenna or a service antenna may be used to form a beam pattern of a desired gain and a desired beam width directed or steered to a desired azimuth and/or a desired elevation. Further, the donor antenna, the service antennas, or both may include respective arrays of antenna elements configured into a respective phased antenna array. In such a case, the processor may provide beam control signals to the respective phased antenna array to cause the phased antenna array to form a desired beam pattern directed toward the base station (for the donor antenna) or directed toward a service area (for a service antenna).

According to an alternative embodiment, the donor and service antennas may form part of, or be contained in, an antenna module that includes a housing, a cover, or some other protective enclosure. The antenna module may also include a support structure to which the donor and service antennas are coupled. Further, the antenna module and/or the support structure may be attached to another electronic device or module, such as a streetlight mountable device, which includes other circuitry of the wireless communication node and optionally circuitry for performing other functions, such as streetlight luminaire control, power metering, location services, and so forth. In such a case, or where the antennas are coupled to a support structure without the antenna module, the antenna module or the support structure may include a light pipe that directs ambient light to a photo sensor in the antenna module, the support structure, or an electronic device to which the antenna module or the support structure is attached. For example, where the antenna module or the support structure is attached to an electronic device mounted to a luminaire of a streetlight and the electronic device includes a photo sensor to facilitate performance of light control functions, the antenna module or the support structure may include a light pipe to permit ambient light to reach the photo sensor of the electronic device. In this embodiment, the electronic device and the antenna module or the support structure may form all or part of the wireless communication node and the electronic device may include the one or more processors, the memory, and various other components of the wireless communication node.

According to a further embodiment of the present disclosure, the stored processor-executable instructions may cause the processor to communicate an initial actuation control signal to the actuator after detecting that the wireless communication node is powered on. In this case, the initial actuation control signal may be part of an automatic configuration operation for the wireless communication node and cause the actuator to rotate the donor and service antennas as a group (e.g., rotate a support structure to which the antennas are coupled) by predetermined angular displacement increments (e.g., 5-10 degree increments) until completing a predetermined amount of displacement or rotation (e.g., 90 degrees, 180 degrees, 270 degrees, or 360 degrees). At each angular displacement increment, the processor may process one or more wireless signals received by the donor antenna to determine whether the signal or signals meet base station discovery criteria to enable base station discovery. The processor may discover a base station on which to lock or to which to establish a connection prior to completion of the automatic configuration process or may collect candidate base station data during the automatic configuration process and select (discover) the base station on which to lock or to which to establish a connection upon completion of the automatic configuration (e.g., after the group of antennas have been rotated through the entire predetermined amount of angular displacement).

According to another exemplary embodiment of the present disclosure, a wireless communication node includes an antenna module, donor and service antennas, an actuator, one or more processors, and a memory. The antenna module includes a support structure defining a central axis. The antennas are oriented in a predetermined arrangement about the central axis and coupled to the support structure. The actuator is operable to rotate the support structure about the central axis in response to one or more actuation control signals. The processor(s) is operable to communicate the actuation control signals to the actuator and process wireless signals received by at least the donor antenna. The memory stores processor-executable instructions that, when executed by the processor, cause the processor to perform an antenna configuration routine.

For example, according to this exemplary embodiment, the stored instructions cause the processor to process a first wireless signal received by the donor antenna and determine whether the first wireless signal meets base station discovery criteria to enable a connection with a base station. A wireless signal received by the donor antenna meets the base station discovery criteria if the wireless signal meets or exceeds the base station discovery criteria. When the first wireless signal does not meet the base station discovery criteria, the stored instructions cause the processor to communicate a first actuation control signal to the actuator, which causes the actuator to rotate the support structure by an angular displacement. After the support structure has been rotated by the angular displacement, the stored instructions cause the processor to process a second wireless signal received by the donor antenna to determine whether the second wireless signal meets the base station discovery criteria. When the second wireless signal does not meet the base station discovery criteria, the stored instructions cause the processor to communicate additional actuation control signals to the actuator to rotate the support structure incrementally by angular displacements until the processor determines that at least one received wireless signal meets the base station discovery criteria. When a wireless signal received by the donor antenna meets the base station discovery criteria, the wireless communication node, through operation of the processor, may establish a connection with the base station that transmitted the criteria-meeting wireless signal. After or as part of establishing the connection, the stored instructions may cause the processor to provide beam control signals to the donor antenna to cause the donor antenna to form a desired beam pattern in a direction of the base station.

According to another exemplary embodiment of the present disclosure, a wireless communication node includes donor and service antennas positioned in a predetermined arrangement about a central axis, an actuator, one or more processors, and a memory. The actuator is operable to rotate the antennas as a group about the central axis in response to one or more actuation control signals. The processor(s) is operable to communicate the actuation control signals to the actuator and process wireless signals received by at least the donor antenna. The memory stores processor-executable instructions that, when executed by the processor, cause the processor to perform an antenna configuration routine.

For example, according to this exemplary embodiment, the stored instructions cause the processor to communicate at least one actuation control signal to the actuator to cause the actuator to rotate the plurality of antennas as a group in angular displacement increments until completing a predetermined angular displacement (e.g., 90 degrees, 180 degrees, 270 degrees, or 360 degrees). The stored instructions also cause the processor to process one or more wireless signals received by the donor antenna at each angular displacement increment to collect candidate base station data. The stored instructions further cause the processor to select a candidate base station to which establish a connection from the candidate base station data and provide beam control signals to the donor antenna to cause the donor antenna to form a desired beam pattern in a direction of the selected base station. The stored instructions may also cause the processor to compare the candidate base station data for each candidate base station to base station discovery criteria and select the candidate base station having candidate base station data that meets the base station discovery criteria. Where the candidate base station data indicates that signals from two or more base stations meet the base station discovery data, the stored instructions may cause the processor to select the base station with the best overall candidate base station data. The stored instructions may further cause the processor to provide beam control signals to each service antenna to cause the service antenna to form a desired beam pattern directed to a respective service area. In this embodiment, where the predetermined angular displacement is greater than 180 degrees, the stored instructions may cause the processor to send actuation control signals to the actuator so as to rotate the donor and service antennas as a group no greater than 180 degrees in either direction (clockwise or counterclockwise) from a starting position in order to mitigate any twisting of cables that may be connected to the antennas, an antenna module that includes the antennas, or a support structure to which the antennas are coupled.

According to another embodiment of the present disclosure, an exemplary method is provided for configuring donor and service antennas of a wireless communication node for operation in a wireless communication system that includes at least one base station and at least the wireless communication node. The method may be performed by one or more processors and/or other components of the wireless communication node. According to this embodiment, the donor and service antennas are configured in a predetermined arrangement about a central axis.

According to the exemplary method, a wireless signal received by the donor antenna is processed and a determination is made as to whether the wireless signal meets base station discovery criteria. When the wireless signal does not meet the base station discovery criteria, the donor and service antennas are rotated as a group about the central axis by an angular displacement. After the rotation, another wireless signal received by the donor antenna is processed and a determination is made as to whether that wireless signal meets the base station discovery criteria. When the wireless signal meets the base station discovery criteria, a beam pattern is formed for the donor antenna in a direction from which the wireless signal was received (e.g., in a direction of the base station). The donor antenna beam pattern may be formed to achieve signal strength above a threshold for subsequent signals received from the base station. When the wireless signal does not meet the base station discovery criteria, the donor and service antennas are rotated as a group about the central axis by another angular displacement. The latter angular displacement may be the same as or different than the former angular displacement (e.g., when using a coarse tune/fine tune process, the angular displacements may change (e.g., become smaller) over the course of the configuration process). After or during formation of the donor antenna's beam pattern, a respective beam pattern is formed for each service antenna to provide wireless coverage to one or more service areas or its respective service area.

Thus, according to this exemplary embodiment, the wireless communication node uses an iterative signal processing and antenna group rotation methodology to automatically configure or position the group of donor and service antennas to enable the donor antenna to establish a high quality wireless communication signal path with a base station. Such a methodology may be very beneficial, both performance-wise and economically, where the wireless communication node is installed in the system at a location where a support structure for the node and utility power are already available, such as at or on a streetlight or other aerial lighting fixture, a utility pole, a building, and so on.

According to a further embodiment of the present disclosure, another exemplary method is provided for configuring donor and service antennas of a wireless communication node for operation in a wireless communication system that includes at least one base station and at least the wireless communication node. The method may be performed by one or more processors and/or other components of the wireless communication node. According to this embodiment, the donor and service antennas are configured in a predetermined arrangement about a central axis.

According to this exemplary method, the donor and service antennas are rotated as a group in angular displacement increments until completing a predetermined angular displacement (e.g., 90 degrees, 180 degrees, 270 degrees, 360 degrees, etc.). At each angular displacement increment, one or more wireless signals received by the donor antenna are processed to collect candidate base station data. Upon completing the predetermined angular displacement, a base station is selected or discovered from the candidate base station data. A beam pattern is then formed for the donor antenna in a direction of the selected based station (e.g., to achieve signal strength or signal quality above a desired level for subsequent signals received from the base station). Additionally, a respective beam pattern is formed for each service antenna to provide wireless coverage to one or more service areas or its respective service area. Where the predetermined angular displacement is greater than 180 degrees, rotation of the donor and service antennas as a group may be limited to no greater than 180 degrees in either direction (clockwise or counterclockwise) from a starting position in order to mitigate any twisting of cables that may be connected to the antennas, an antenna module that includes the antennas, or a support structure to which the antennas are coupled.

Thus, according to this exemplary embodiment, the wireless communication node uses a more comprehensive analysis approach to automatically configure or position the group of donor and service antennas to enable the donor antenna to establish a high quality wireless communication path with a base station. According to this embodiment, signals received by the donor antenna over a larger angular displacement or rotation are processed before selecting a base station to which to establish a connection. Such a methodology may be very useful where the wireless communication node is installed in the system at a fixed location where a support structure for the node and utility power are already available, such as at or on a streetlight or other aerial lighting fixture, a utility pole, a building, and so forth.

According to yet another exemplary embodiment of the present disclosure, a wireless communication node includes donor and service antennas positioned in a predetermined arrangement about a central axis, one or more processors, a memory, and an alerting mechanism (e.g., one or more light emitting diodes (LEDs), a display, a speaker, or a communication module providing Wi-Fi, BLUETOOTH, cellular, or other known wireless communications). The processor(s) is operable to process wireless signals received by at least the donor antenna and control operation of the alerting mechanism. The memory stores processor-executable instructions that, when executed by the processor, cause the processor to perform an antenna configuration routine.

According to this exemplary embodiment, the stored instructions cause the processor to process a first wireless signal received by the donor antenna and determine whether the first wireless signal meets base station discovery criteria to enable a connection with a base station. A wireless signal received by the donor antenna meets the base station discovery criteria if the wireless signal meets or exceeds the base station discovery criteria. When the first wireless signal does not meet the base station discovery criteria, the stored instructions cause the processor to control the alerting mechanism to inform a user, such as an installer of the wireless node, that the base station discovery criteria has not been met. For example, the processor may send one or more alerting control signals to the alerting mechanism to cause the alerting mechanism to, for example, display a particular color (e.g., red) continuously or for a short period of time (e.g., where the alerting mechanism is an LED) or communicate a message (e.g., a "no lock" message) to a mobile application executing on a mobile device possessed by the user (e.g., where the alerting mechanism is a wireless communication module) to inform the user that the base station discovery criteria has not been met. After sending the alerting control signal(s) to the alerting mechanism, the stored processor instructions cause the processor to wait (e.g., a predetermined amount of time or until instructed via the mobile application or otherwise) until the group of antennas has been rotated, manually or electronically, by an angular displacement. For example, a support structure to which the group of antennas are coupled may be rotated by the angular displacement thereby rotating all the antennas in the group by such angular displacement.

After completing the waiting period, the stored instructions cause the processor to process another wireless signal received by the donor antenna to determine whether such wireless signal meets the base station discovery criteria. When the newly received signal does not meet the base station discovery criteria, the stored instructions cause the processor to again send one or more alerting control signals to the alerting mechanism to cause the alerting mechanism to inform the user that the base station discovery criteria has not been met and await the next angular displacement of the group of antennas. When the processor determines that a wireless signal received by the donor antenna meets the base station discovery criteria, the processor may send one or more other alerting control signals to the alerting mechanism to cause the alerting mechanism to, for example, display a different color (e.g., green) continuously or for a short period of time (e.g., where the alerting mechanism is an LED) or communicate a different message (e.g., a "lock made" message) to the mobile application executing on the user's mobile device (e.g., where the alerting mechanism is a wireless communication module) to inform the user that the base station discovery criteria has been met. Additionally, the wireless communication node, through operation of the processor, may establish a connection with the base station that transmitted the criteria-meeting wireless signal. After or as part of establishing the connection, the stored instructions may cause the processor to provide beam control signals to the donor antenna to cause the donor antenna to form a desired beam pattern in a direction of the base station.

BRIEF DESCRIPTION OF THE DRAWINGS

Non-limiting and non-exhaustive embodiments are described with reference to the following drawings, wherein like reference numerals refer to like parts or elements throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings.

DETAILED DESCRIPTION

In the following description, certain specific details are set forth to provide a thorough understanding of various disclosed embodiments. However, one skilled in the relevant art will recognize that embodiments may be practiced without one or more of these specific details, or with other methods, components, materials, etc. Also in these instances, well-known structures have been omitted or shown and described in reduced detail to avoid unnecessarily obscuring descriptions of the embodiments.

Figure 1:
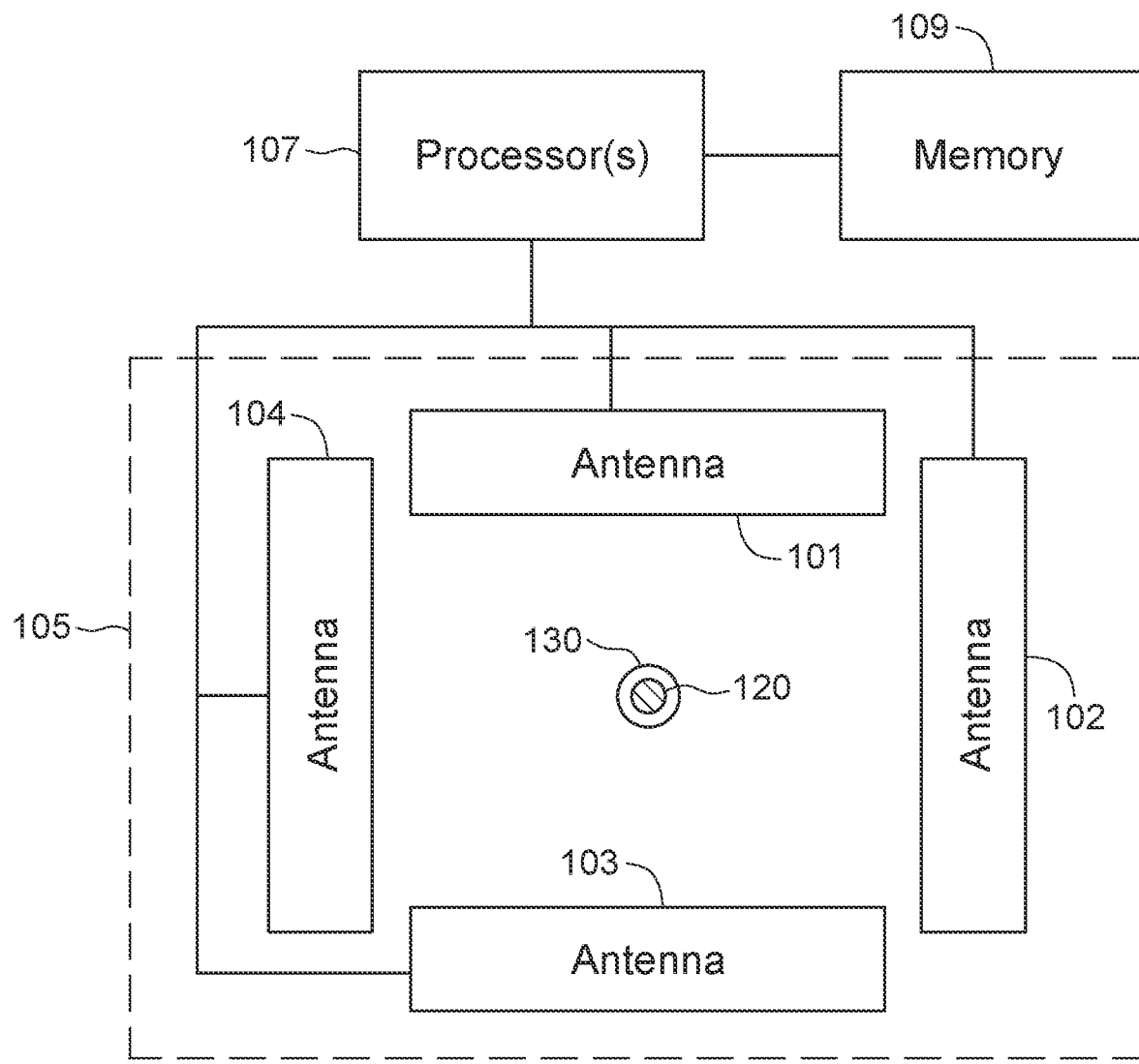
FIG. 1 illustrates a block diagram of a wireless communication node in accordance with one exemplary embodiment of the present disclosure.
Figure 2:
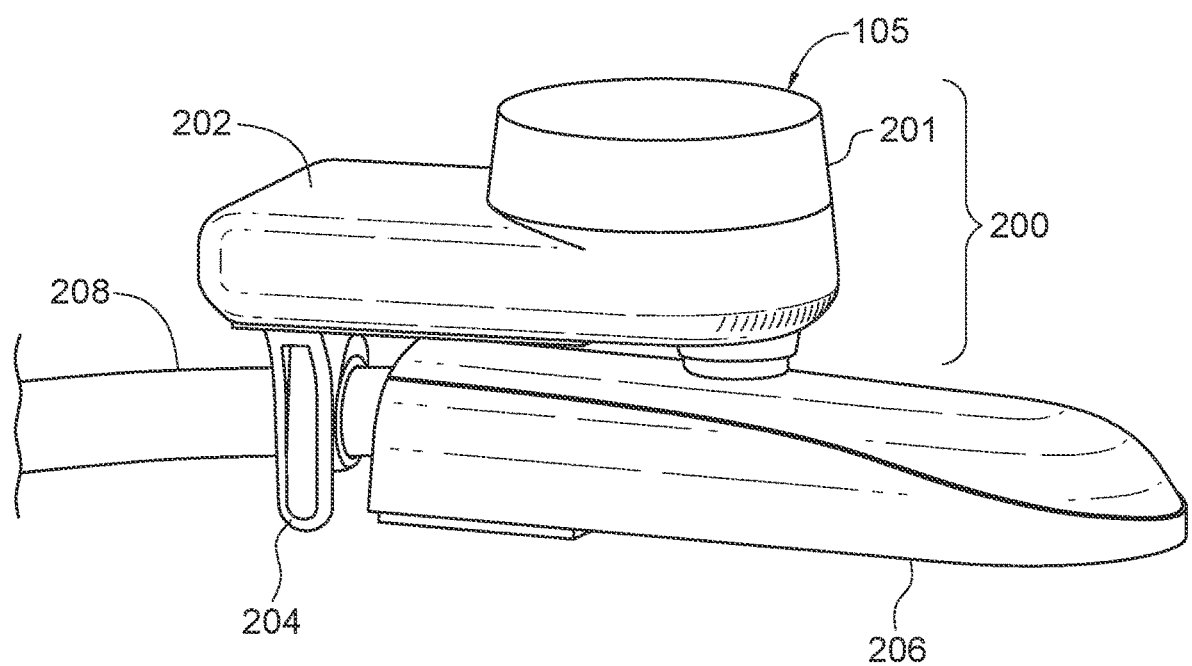
FIG. 2 illustrates a perspective view of the wireless communication node of FIG. 1 as mounted in an exemplary manner on a streetlight, in accordance with another exemplary embodiment of the present disclosure.

Referring to FIGS. 1 and 2, a wireless communication node 200 is illustrated in block diagram and streetlight-mounted form, in accordance with one exemplary embodiment of the present disclosure. The exemplary wireless communication node 200 includes a set or group of two or more antennas 101-104 (four shown for illustration purposes only) oriented in different directions, one or more processors 107 (one shown for illustration purposes only), and a memory 109. The wireless communication node 200 may be a repeater, a relay node, or a small cell node in a radio access network (RAN), or an Integrated Access and Backhaul (IAB) node in an IAB network.

In the exemplary embodiment illustrated in FIG. 1, the antennas 101-104 are fixedly positioned and immovable individually or as a group. Where the set of antennas 101-104 includes four antennas 101-104, each antenna 101-104 may be configured substantially orthogonal to a neighboring antenna 101-104, such as illustrated in FIG. 1. Positioning each antenna 101-104 substantially orthogonal to each neighboring antenna 101-104 helps provide isolation between the antennas 101-104 during operation. In other embodiments, such as the embodiments discussed below with respect to FIGS. 4-9, the antennas 101-104 may be rotatable as a group about a central axis (e.g., axis 606 in FIG. 6).

In FIG. 1, the antennas 101-104 of the exemplary wireless communication node 200 are illustrated as being generally coplanar. However, in alternative embodiments, the antennas 101-104 may be positioned in different planes (e.g., different parallel planes) relative to one another, such as in a stacked arrangement, an offset stacked arrangement, or other multiplanar configurations.

The memory 109 stores instructions that are executable by the processor 107 during operation of the wireless communication node 200. The instructions may be implemented as firmware, software, or any set of data that is executable or usable by the processor 107 to cause the processor 107 to perform various routines, algorithms, processes, or methods. The memory 109 may be used for other purposes too, including storing data reported from sensors within or attached to the wireless communication node 200, storing additional instructions to cause the processor 107 to perform artificial intelligence or other functions, and for other purposes. The processor 107 may be any known processor or processors and, in some embodiments, may be field programmable. Where the processor 107 is field programmable, the processor 107 may be implemented as or include a field programmable gate array.

As very generally illustrated in FIG. 1 and described in more detail below, the processor 107 interfaces with the set of antennas 101-104 to receive and process wireless signals received by the antennas 101-104 and to provide beam control signals to the antennas 101-104, when the antennas 101-104 are constructed so as to be capable of receiving and responding to such control signals. For example, where the antennas 101-104 are constructed to facilitate electronic beam formation (e.g., beamforming, beam steering, or spatial filtering), such as where the antennas 101-104 are electronically controllable phased array antennas, the antennas 101-104 may be controllable by the processor 107.

One of ordinary skill in the art will readily recognize and appreciate that the block diagram of FIG. 1 does not depict various components that may be included in a particular wireless communication node 200, including, but not limited to, a power supply, one or more wireless transceivers, filters, a high precision clock, and various other components and modules that may be included in 5G wireless communication equipment. Such components have been omitted from the drawings to minimize complexity and facilitate a better understanding of the subject matter of the present disclosure.

To protect the antennas 101-104 from weather and other environmental effects, the antennas 101-104 may form part of an antenna module 105, which may include a housing 201 and/or a support structure. Where the wireless communication node 200 also performs functions based on an amount of ambient light that is detected, such as providing control of a streetlight luminaire 206 or other aerial lighting fixture to or for which the wireless communication node 200 is mounted, attached or configured to control, the wireless communication node 200 may include a photo sensor 130. In some embodiments, the photo sensor 130 may be positioned in the antenna module 105 or another electronic device or module 202 of the wireless communication node 200 to which the antenna module 105 is attached. The electronic module 202 may be a small cell node or a multi-function device that includes, for example, small cell functionality, light control functionality, power metering, tilt and/or vibration sensing, image capture functionality, and/or general Internet of Things (IoT) functionality. Where the wireless communication node 200 includes an antenna module 105 and/or an electronic module 202 to which the antenna module 105 is attached, the wireless communication node 200 or its antenna module 105 (e.g., as part of the antenna module's support structure) may further include a light pipe 120 for directing ambient light to the wireless communication node's photo sensor 130. In the case where the photo sensor 130 is included within the electronic module 202 to which the antenna module 105 is attached and the electronic module 202 and its photo sensor 130 are positioned below (or above, depending on installation configuration) the antenna module 105, the light pipe 120 may be routed through the antenna module housing 201 or through an antenna module support structure, such as a post configured between the antenna module housing 201 and an aperture in the electronic module 202 aligned with the photo sensor 130.

As illustrated in FIG. 2, the wireless communication node 200 may be mountable to a streetlight or other fixture exposed to ambient light. In the case where the wireless communication node 200 is mounted to a streetlight, the wireless communication node's photo sensor 130 may be used as part of a system for controlling operation of the streetlight. In FIG. 1, the light pipe 120 and the photo sensor 130 are shown disposed linearly along a central, vertical axis of the antenna module 105 or its support structure. However, one skilled in the art will readily appreciate that the light pipe 120 may be routed in any manner to direct ambient light to a photo sensor 130 positioned below the antenna module 105 or at another location. In a further embodiment, the photo sensor 120 may be included in the antenna module 105 instead of in an electronic module 202 to which the antenna module 105 is attached.

Referring again to FIG. 2, the wireless communication node 200 may be streetlight-mountable through use of an electric socket integrated into the top of a streetlight luminaire 206. To secure the wireless communication node 200 to the streetlight with adequate strength to withstand wind load and other various environmental conditions, the wireless communication node 200, or a portion of it (e.g., the electronic module 202), may be secured to the streetlight pole 208 through use of a mounting bracket 204.

Figure 3:
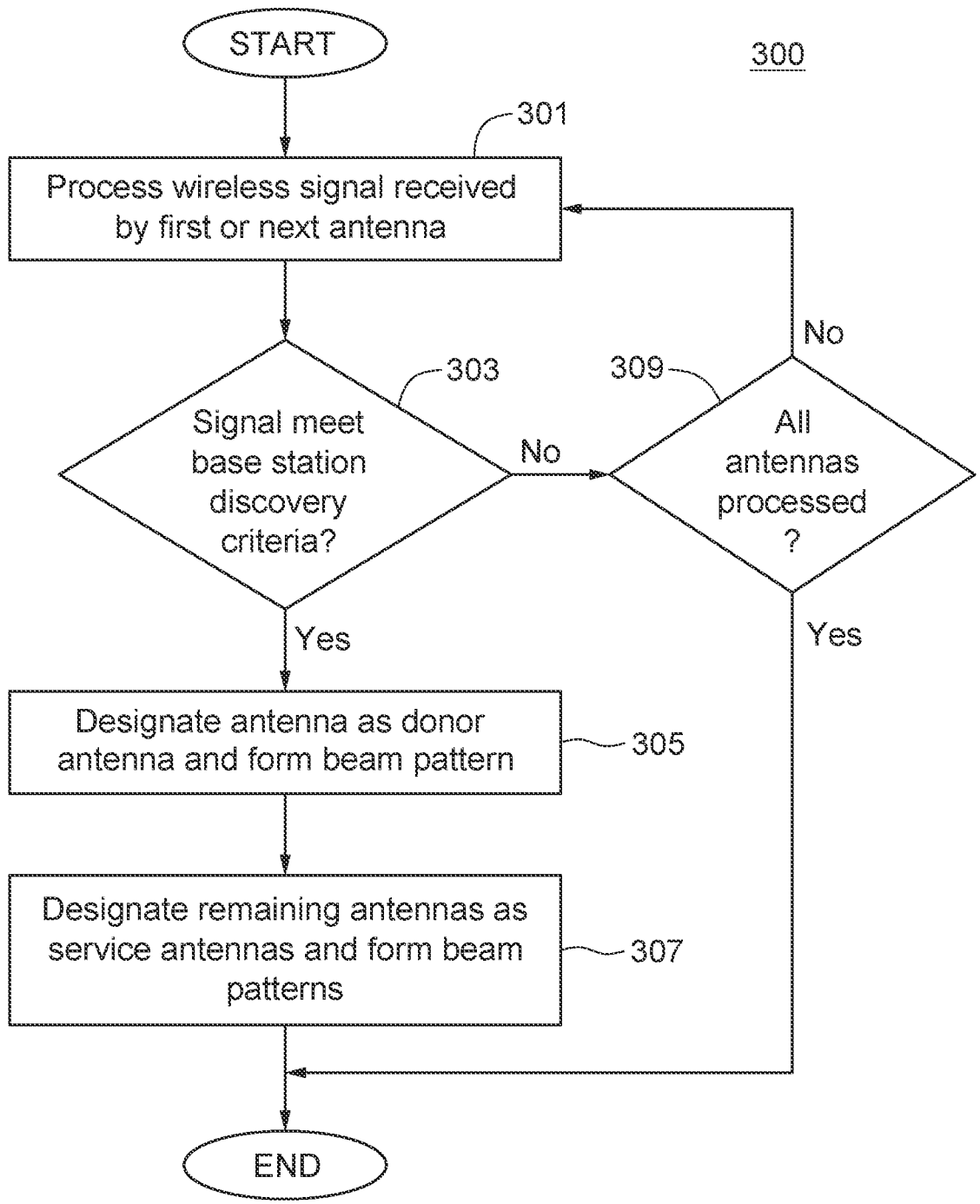
FIG. 3 illustrates a logic flow diagram of steps performed to select donor and service antennas of the wireless communication node of FIG. 1, in accordance with further exemplary embodiments of the present disclosure.

FIG. 3 illustrates a logic flow diagram 300 of steps performed to select a donor antenna and one or more service antennas from the set of antennas 101-104 included as part of the exemplary wireless communication node 200. The logic flow steps of FIG. 3 may be performed by the one or more processors 107 of the wireless communication node 200 through execution of instructions stored in the node's memory 109.

According to the logic flow of FIG. 3, the processor 107 processes (301) at least one wireless signal received by a first one of the antennas 101-104. The first antenna may be any one of the antennas 101-104 from which the donor and service antennas will be selected. The processor 107 determines (303) whether any wireless signal received by the first antenna meets base station discovery criteria. Such criteria may include, among other things, whether the signal includes an identifier for a base station (e.g., a gNB identifier), whether a signal strength or other signal quality metric for the received signal meets a desired strength or quality level, whether channel loading for the base station is determined to be less than a maximum threshold based on data or information in the signal, and/or whether frequencies and bandwidths supported by the base station are within a desired frequency range with minimum bandwidth thresholds.

In some embodiments, multiple wireless signals may be detected from the first antenna (e.g., antenna 101) or any subsequently evaluated antenna (e.g., antennas 102-104). For example, as part of the evaluation of the first antenna, the processor 107 may send control signals to the antenna 101 to form a beam pattern having predetermined or intelligently-selected beam width or conical field of view (e.g., a 15-degree conical field of view). The processor 107 may then send control signals to the antenna 101 to electronically steer the beam pattern across its entire azimuth range seeking to receive any base station signals. Where the wireless communication node 200 includes four antennas 101-104 configured as illustrated in FIG. 1, the azimuth range of each antenna 101-104 encompasses about 90 degrees of the entire azimuth range of the set of antennas 101-104 (e.g., 360 degrees). In such cases, each wireless signal received by the antenna under evaluation 101-104 may be processed to determine whether the signal meets the base station discovery criteria.

When the processor 107 determines (303) that a wireless signal received from the first antenna (e.g., antenna 101) meets base station discovery criteria, the processor 107 designates (305) the antenna 101 as the donor antenna for the wireless communication node 200 and forms (305) a beam pattern for the donor antenna 101 in a direction of the wireless signal or from which the wireless signal was received, which also has a high probability of being the direction of the discovered base station. To form the donor antenna's beam pattern, the processor 107 may provide one or more beam control signals to the donor antenna 101 (e.g., to antenna elements of the antenna's phased array) to cause the beam pattern to have a desired gain, beam width, and/or conical field of view, or to achieve a signal strength above a threshold for subsequent signals received from the base station. After or contemporaneous with designating the donor antenna 101, the processor 107 designates (307) some or all of the remaining antennas (e.g., antennas 102-104) as service antennas and forms (307) beam patterns for one or more of those antennas 102-104 so as to provide wireless coverage to one or more service areas. To form the beam patterns for the service antennas 102-104, the processor 107 may provide one or more beam control signals to each service antenna 102-104 (e.g., to antenna elements of the antenna's phased array) to cause the service antenna 102-104 to form a respective beam pattern to provide wireless coverage to the one or more service areas.

When the processor 107 determines (303) that a wireless signal received from the first antenna 101 does not meet the base station discovery criteria, or that no wireless signal received from the first antenna 101 meets the base station discovery criteria (e.g., where wireless signals are received for a preset or variable period of time), the processor 107 determines (309) whether all the antennas 101-104 of the wireless communication node 200 have been processed. If all the antennas 101-104 have not yet been processed, then the processor 107 processes (301) one or more wireless signals received from another one of the antennas 102-104 and the signal analysis process repeats until either the antennas 101-104 have been designated as donor and service antennas and their beam patterns have been formed or no wireless signal has been received that meets the base station discovery criteria. If the latter condition occurs, the instructions stored in the memory 109 may cause the processor 107 to wait a predetermined period of time (e.g., 30 seconds to 5 minutes) and then repeat the logic flow of FIG. 3.

Where the wireless communication node 200 includes four fixed antennas 101-104 as generally illustrated in FIG. 1, the beam pattern of each antenna 101-104 may be formed to serve its determined purpose. For example, the beams of the service antennas 102-104 may be formed to cover one or more desired or selected service areas; whereas, the beam pattern for the donor antenna 101 may be formed to achieve maximum signal strength for signals received from the discovered base station. Beam formation for each antenna 101-104 may depend upon various factors, including the antenna's center frequency and bandwidth, use case, and quantity of phased antenna array elements. As one example, where three service antennas 102-104 are intended to cover a 270-degree azimuth after determination of the donor antenna 101, the beam pattern for each service antenna 102-104 may be formed to have a beam width of about 60 degrees and be electronically steerable to cover about a 120-degree conical field of view in the azimuth.

Referring to FIGS. 4-7, an alternative wireless communication node 400 is illustrated in block diagram and other forms, in accordance with another exemplary embodiment of the present disclosure. The alternative, exemplary wireless communication node 400 includes a set or group of two or more antennas 401-404 (four shown for illustration purposes only) oriented in different directions, one or more processors 407 (one shown for illustration purposes only), an optional but preferred actuator 408, a memory 409, and an optional alerting mechanism 411. When included, the actuator 418 may be a servo, stepper, induction or other type of motor that can provide sufficient torque to rotate the antennas 401-404 as a group (e.g., rotate a support structure to which the antennas 401-404 are coupled) by selected angular displacement amounts. When included, the alerting mechanism 411 may be, for example, one or more light emitting diodes (LEDs), a display, a speaker, or a communication module providing Wi-Fi, BLUETOOTH, cellular, or other known wireless communications. The wireless communication node 400 may be a repeater, a relay node, or a small cell node in a radio access network (such as, for example, a time division duplex (TDD) or frequency division duplex (FDD) 5G network), or an IAB node in an IAB network.

Figure 4:
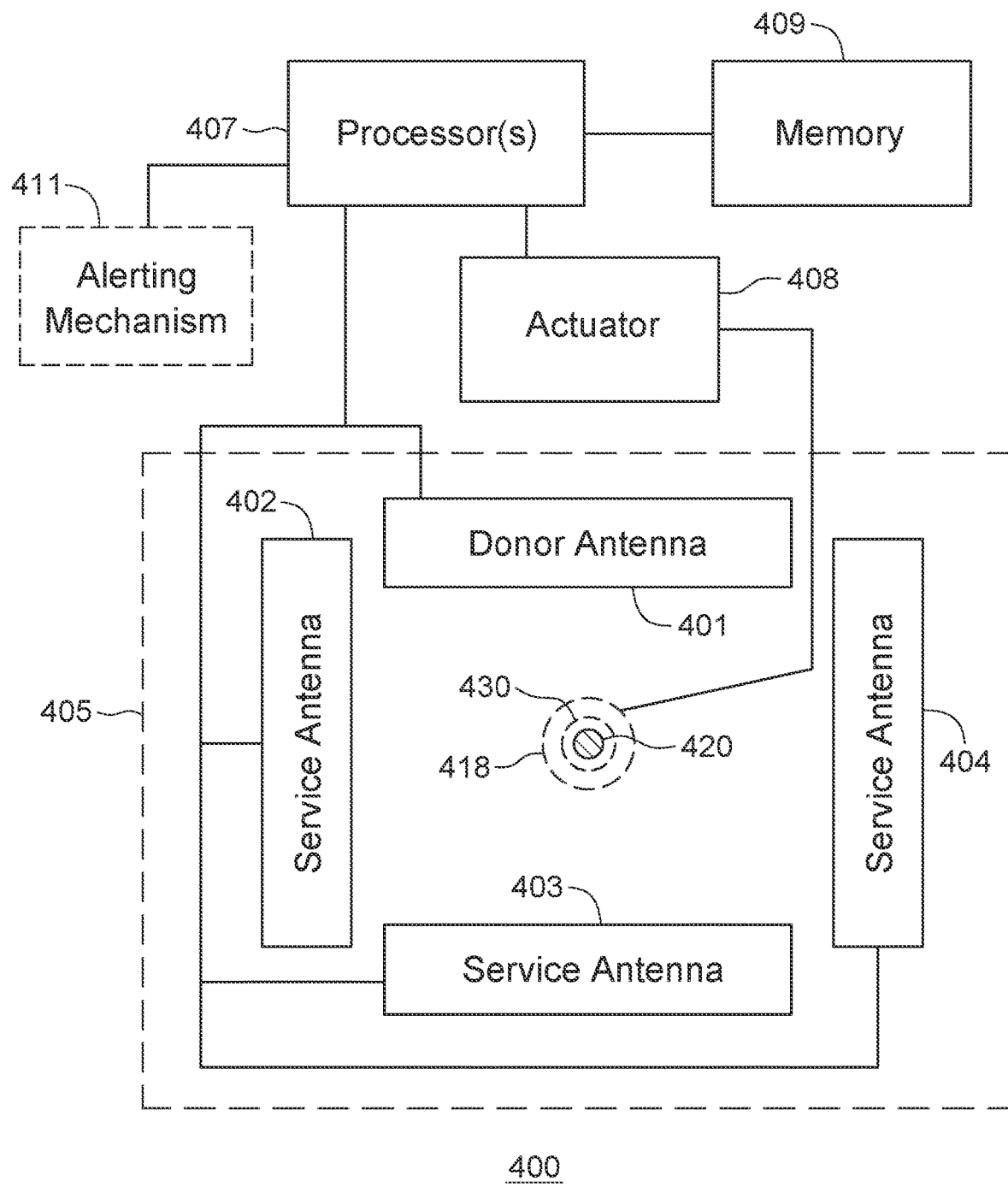
FIG. 4 illustrates a block diagram of an alternative wireless communication node in accordance with another exemplary embodiment of the present disclosure.
Figure 5:
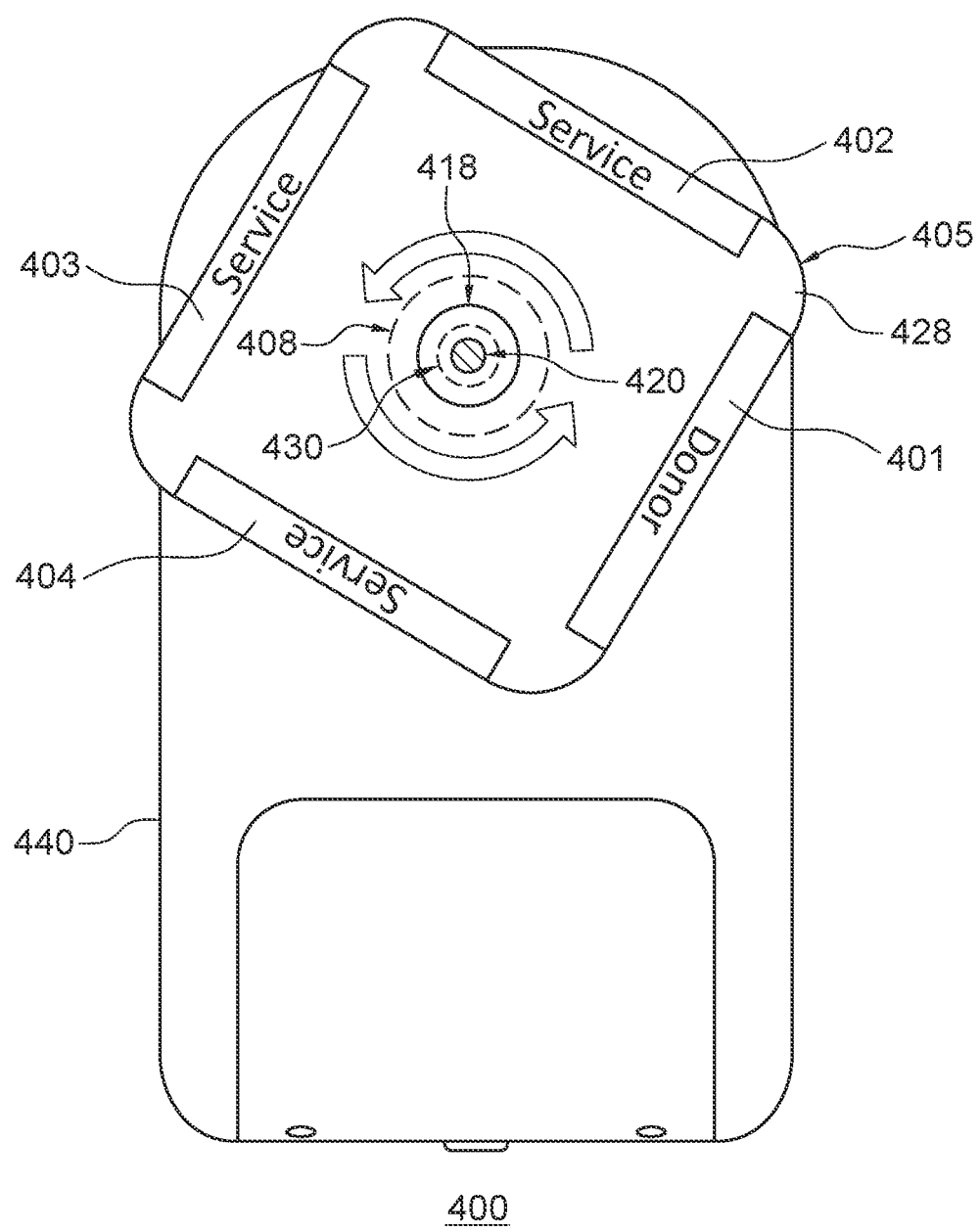
FIG. 5 illustrates a combined top view and block diagram of the wireless communication node of FIG. 4 in an exemplary streetlight-mountable form, in accordance with a further embodiment of the present disclosure.

In the exemplary embodiment illustrated in FIGS. 4-7, the antennas 401-404 are rotatable as a group about a central axis 606 by the actuator 408 or manually. Where the set of antennas includes four antennas 401-404, each antenna 401-404 may be configured substantially orthogonal to a neighboring antenna 401-404, such as illustrated in FIGS. 4 and 5. Positioning each antenna 401-404 substantially orthogonal to each neighboring antenna 401-404 helps provide isolation and mitigates crosstalk between the antennas 401-404 during operation.

The antennas 401-404 of the exemplary wireless communication node 400 are illustrated as being generally coplanar. However, in alternative embodiments, the antennas 401-404 may be positioned in different planes (e.g., different parallel planes) relative to one another, such as in a stacked arrangement, an offset stacked arrangement, or other multiplanar configurations.

The memory 409 stores instructions that are executable by the processor 407 during operation of the wireless communication node 400. The instructions may be implemented as firmware, software, or any set of data that is executable by the processor 407 to cause the processor 407 to perform various routines, algorithms, processes, or methods. The memory 409 may be used for other purposes too, including storing data reported from sensors within or attached to the wireless communication node 400, storing additional instructions to cause the processor 407 to perform artificial intelligence or other functions, and for other purposes. The processor 407 may be any known processor or processors and, in some embodiments, may be field programmable. Where the processor 407 is field programmable, the processor 407 may be implemented as or include a field programmable gate array.

As very generally illustrated in FIG. 4 and described in more detail below, the processor 407 interfaces with the donor and service antennas 401-404 to receive and process wireless signals received by the antennas 401-404 and to provide beam control signals to the antennas 401-404, when the antennas 401-404 are constructed so as to be capable of receiving and responding to such control signals. For example, where the antennas 401-404 are constructed to facilitate electronic beam formation (e.g., beamforming, beam steering, or spatial filtering), such as where the antennas 401-404 are electronically controllable phased array antennas, the antennas 401-404 may be controllable by the processor 407.

One of ordinary skill in the art will readily recognize that the block diagram of FIG. 4 does not depict various components that may be included in a particular wireless communication node 400, including, but not limited to, a power supply, one or more wireless transceivers, filters, a high precision clock, and various other components and modules that are conventional to 5G wireless communication equipment. Such components have been omitted from the drawings to minimize complexity and to facilitate a better understanding of the subject matter of the present disclosure.

To protect the antennas 401-404 from weather and other environmental effects, the antennas 401-404 may form part of an antenna module 405, which may include a housing 616 and/or a support structure. When included, the support structure may be or include a platform 428, a post 418, a combination thereof, or any other elements or components that may support the antennas 401-404 and facilitate their rotation as a group. For example, the support structure may be or include a post 418 or other structure or structures to which the antennas 401-404 may be coupled to facilitate their rotation as a group by the actuator 408 or manually. The antenna module 405 or its support structure or a portion thereof (e.g., the post 418) may define a central axis 606 for the antenna module 405 about which the donor and service antennas 401-404 are configured in a predetermined arrangement (e.g., orthogonal to their neighboring antennas when a total of four antennas 401-404 are used).

Where the wireless communication node 400 also performs functions based on an amount of ambient light that is detected, such as providing control of a streetlight luminaire 206 or other aerial lighting fixture to of for which the wireless communication node 400 is mounted, attached or configured to control, the wireless communication node 400 may include a photo sensor 430. In some embodiments, the photo sensor 430 may be positioned in the antenna module 405 or another electronic device or module 440 of the wireless communication node 400 to which the antenna module 405 is attached. The electronic module 440 may be a small cell node or a multi-function device that includes, for example, small cell functionality, light control functionality, power metering, tilt and/or vibration sensing, image capture functionality, and/or general Internet of Things (IoT) functionality. Where the wireless communication node 400 includes an antenna module 405 and/or an electronic module 440 to which the antenna module 405 is attached, the wireless communication node 400 or its antenna module 405 may further include a light pipe 420 for directing ambient light to the wireless communication node's photo sensor 430. In the case where the photo sensor 430 is included within the electronic module 440 to which the antenna module 405 is attached and the electronic module 440 and its photo sensor 430 are positioned below (or above, depending on installation configuration) the antenna module 405, the light pipe 420 may be routed through the antenna module housing 616 or through an antenna module support structure, such as a post 418 configured between the antenna module housing 616 and an aperture in the electronic module 440 aligned with the photo sensor 430.

Figure 6:
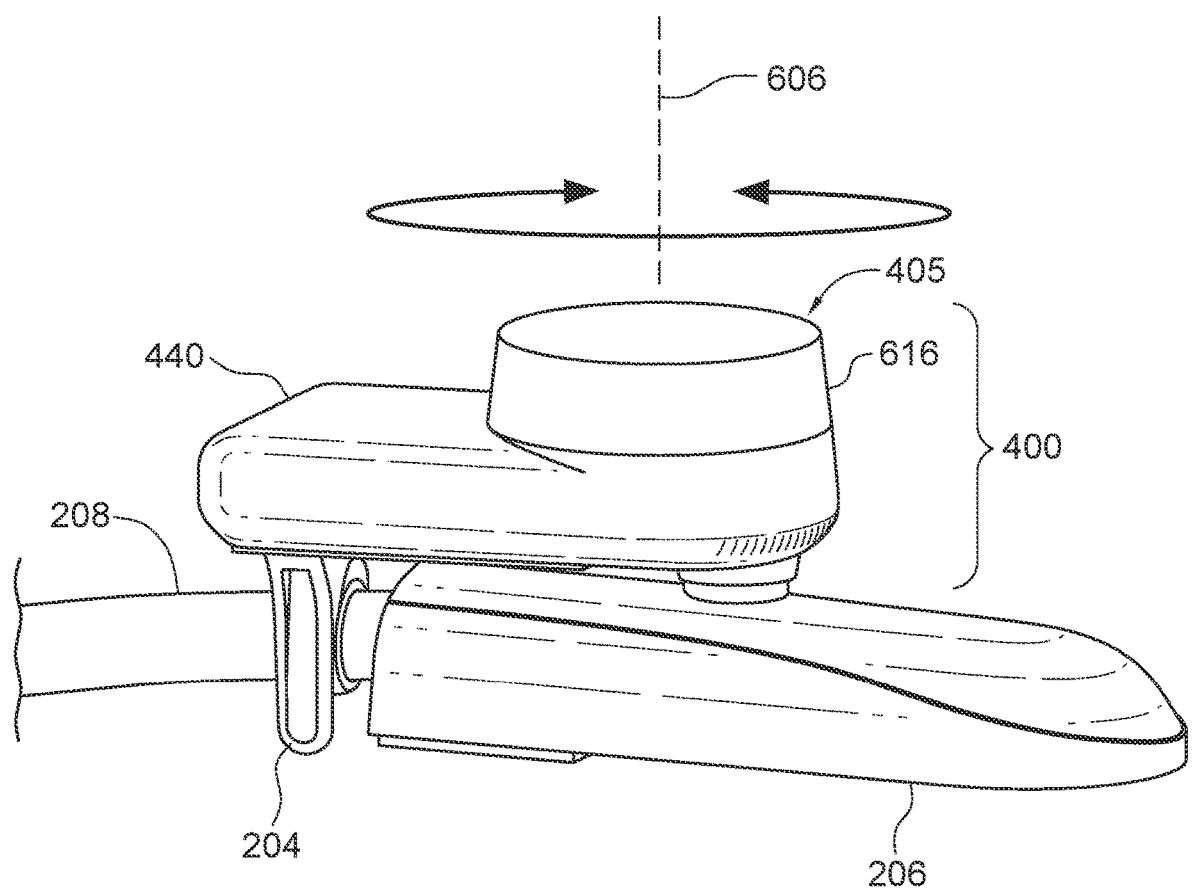
FIG. 6 illustrates a perspective view of the wireless communication node of FIG. 4 as mounted in an exemplary manner on a streetlight, in accordance with another exemplary embodiment of the present disclosure.

As illustrated in FIG. 6, the wireless communication node 400 may be mountable to a streetlight or other fixture exposed to ambient light. In the case where the wireless communication node 400 is mounted to a streetlight, the wireless communication node's photo sensor 430 may be used as part of a system for controlling operation of the streetlight. In FIGS. 4 and 5, the light pipe 420 and the photo sensor 430 are shown disposed linearly along a central, vertical axis of the antenna module 105, such as along an axis defined by a post 418 of a support structure. However, one skilled in the art will readily appreciate that the light pipe 420 may be routed in any manner to direct ambient light to a photo sensor 430 positioned below the antenna module 405 or at another location. In a further embodiment, the photo sensor 420 may be included in the antenna module 405 instead of in an electronic module 440 to which the antenna module 405 is attached.

As illustrated in FIG. 6, the wireless communication node 400 may be streetlight-mountable through use of an electric socket integrated into the top of the streetlight luminaire 206. To secure the wireless communication node 400 to the streetlight with adequate strength to withstand wind load and other various environmental conditions, the wireless communication node 400, or a portion of it (e.g., the electronic module 440), may be secured to the streetlight pole 208 through use of a mounting bracket 204.

Figure 7:
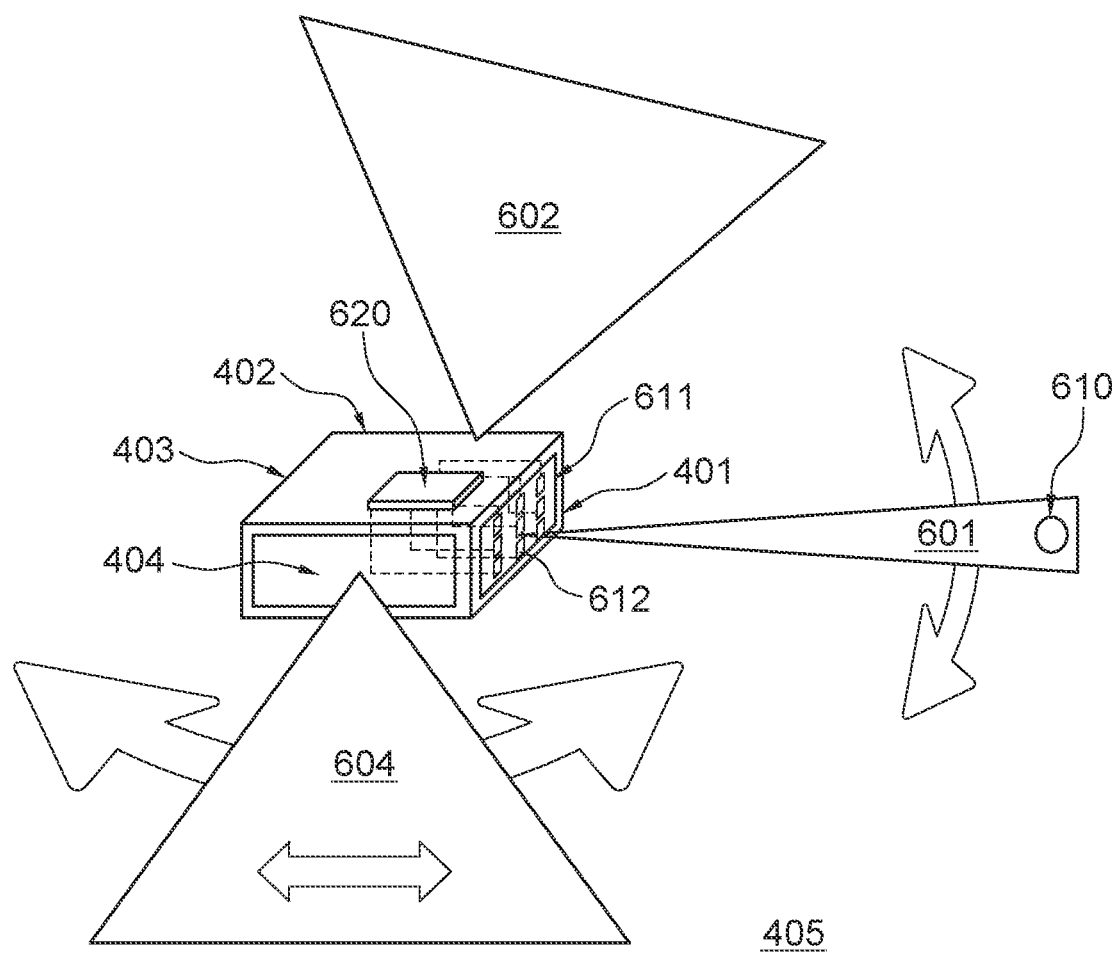
FIG. 7 illustrates exemplary antenna implementation and beam pattern formation for various antennas of the wireless communication node of FIG. 2 or FIG. 4, in accordance with further exemplary embodiments of the present disclosure.

FIG. 7 illustrates exemplary antenna implementation and beam pattern formation embodiments for various antennas 401-404 of the wireless communication node 400 of FIG. 4, in accordance with further exemplary embodiments of the present disclosure. The antenna implementation and beam pattern formation embodiments illustrated in FIG. 7 may also be used for implementing and forming beam patterns for the antennas 101-104 of the wireless communication node 200 described above with respect to FIGS. 1 and 2.

In some embodiments, one or more of the donor and service antennas 101-104, 401-404 may be implemented or include a phased antenna array 611 containing an array of antenna elements 612. For example, as illustrated in FIG. 7, a phased antenna array module 611 may be part of the donor antenna 401 or any other antenna 101-104, 402-404 and include an array of antenna elements 612 configured on a substrate. The antenna elements 612 of the phased antenna array 611 may be coupled to a local controller board 620, which may form one of the processors 407, to enable the controller board 620 to form and re-from (e.g., steer) a beam pattern 601 for the applicable antenna 101-104, 401-404 (e.g., the donor antenna 401 in this example). According to some embodiments, the donor antenna 401 has a higher gain and a narrower beam width than the gains and beam widths of the service antennas 402-404. In the exemplary embodiment illustrated in FIG. 7, the donor antenna 401 has a high gain, narrow bandwidth (e.g., in the 5-degree to 20-degree conical field range) beam pattern directed toward a discovered base station 610. During the beam formation process performed upon discovery of a base station, one or more of the processors 407 (e.g., the local controller 620) provides beam control signals to the antennas 401-404 to form the beam patterns for the antennas 401-404 (e.g., pattern 601 for the donor antenna 401, pattern 602 for one service antenna 402, and pattern 604 for service antenna 404). It should be noted, as illustrated in FIG. 7, one or more of the service antennas 402-404 may not be used after discovery of the base station 610 because service coverage may not be needed in the coverage area or areas of such antenna or antennas. The stored instructions in the wireless communication node's memory 409 may cause the processor 407 to use only some of the service antennas 402-404 after discovery of the base station 610 depending on the locations of the service areas to be supported by the service antennas 402-404.

Figure 8:
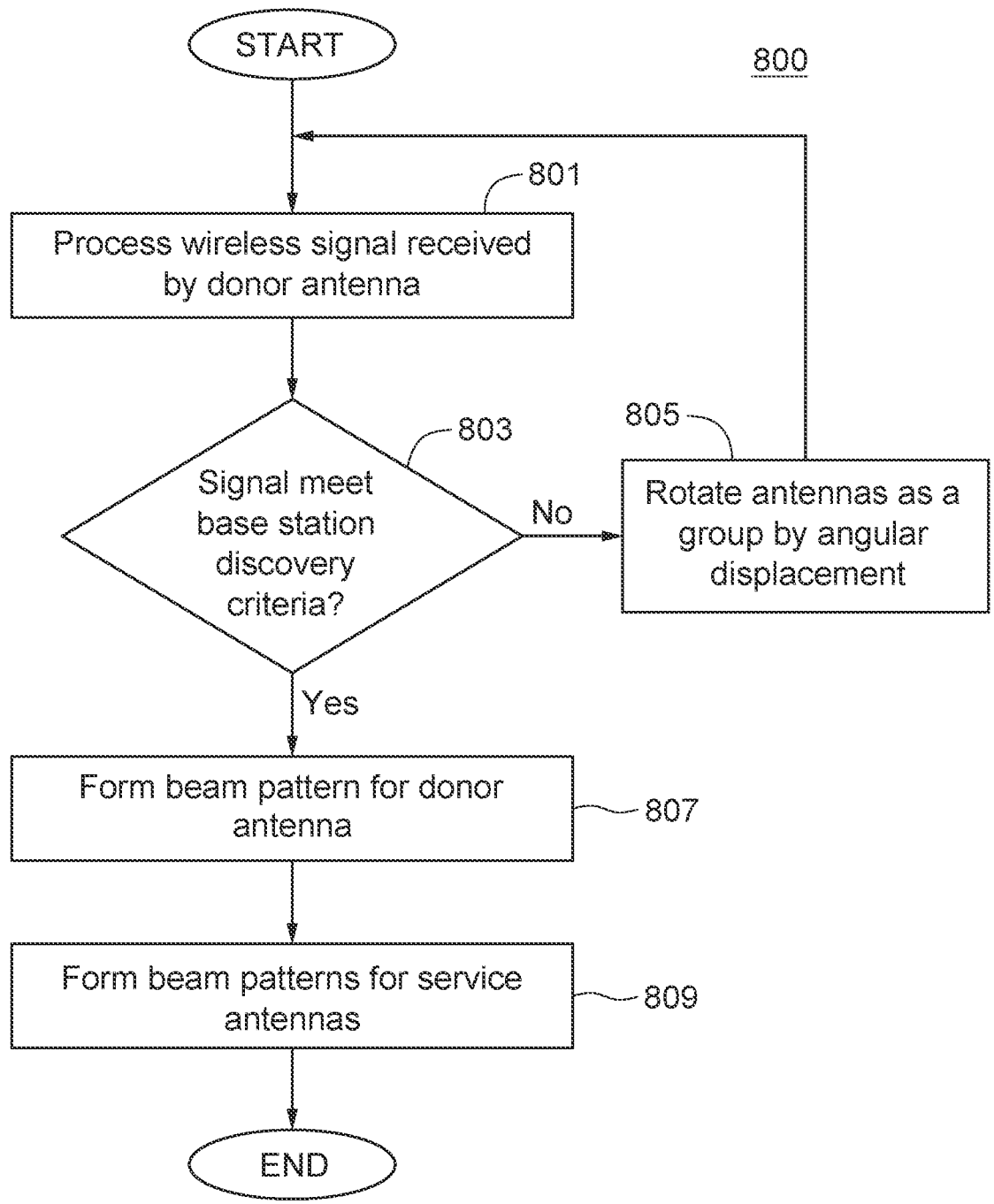
FIG. 8 illustrates a logic flow diagram of steps performed to configure donor and service antennas of the wireless communication node of FIG. 4, in accordance with further exemplary embodiments of the present disclosure.

FIG. 8 illustrates a logic flow diagram 800 of steps performed to configure the donor and service antennas 401-404 of the alternative, exemplary wireless communication node 400, in accordance with further exemplary embodiments of the present disclosure. The logic flow steps of FIG. 8 may be performed by one or more processors 407 of the wireless communication node 400 through execution of instructions stored in the node's memory 409.

According to the logic flow of FIG. 8, the processor 407 processes (801) at least one wireless signal received by the donor antenna 401 and determines (803) whether the wireless signal received by the donor antenna 401 meets base station discovery criteria. As discussed above, such criteria may include, among other things, whether the signal includes an identifier (e.g., a gNB identifier) for a base station, whether a signal strength or other signal quality metric for the received signal meets a desired strength or quality level, whether channel loading for the base station is determined to be less than a maximum threshold based on data or information in the signal, and/or whether frequencies and bandwidths supported by the base station are within a desired frequency range with minimum bandwidth thresholds.

When the processed signal does not meet the base station discovery criteria, the processor 407 rotates (805) the donor and service antennas 401-404 as a group about a central axis 606 by an angular displacement. The angular displacement may be any desired displacement. In one exemplary embodiment, the angular displacement is in a range of five to fifteen degrees in a particular direction (e.g., clockwise or counterclockwise). The processor 407 may perform the rotation by providing one or more actuation control signals to an actuator 408 configured to turn a support structure to which the antennas 401-404 are coupled.

After the antennas 401-404 have been rotated by the angular displacement, the processor processes (801) another signal received by the donor antenna 401 while oriented in its new direction and determines (803) whether the received signal meets the base station discovery criteria. When this received signal does not meet the base station discovery criteria, the rotate and process routine continues until a wireless signal received by the donor antenna 401 meets the base station discovery criteria. The angular displacement during each rotation phase of the antenna configuration process may be the same or different than the previous angular displacement depending on the algorithm or method selected for base station discovery. For example, where a coarse/fine tuning discovery approach is implemented, the angular displacement of the group of antennas 401-404 may be larger earlier in the process and then get progressively smaller.

Once a wireless signal received by the donor antenna 401 meets the base station discovery criteria, the processor forms (807) a beam pattern for the donor antenna 401 in a direction from which the wireless signal meeting the base station discovery criteria was received (e.g., in a direction of the discovered base station 610 that transmitted the wireless signal). The processor 407 may form the donor antenna's beam pattern by providing one or more beam control signals to the donor antenna 401 (e.g., to the donor antenna's antenna elements 612) to cause the donor antenna 401 to form a beam pattern to achieve a signal strength above a threshold for subsequent signals received from the discovered base station 610.

The processor 407 also forms (809) beam patterns for the service antennas 402-404 to provide wireless coverage to one or more service areas. The beam patterns for the service antennas 402-404 may have substantially less gain and wider conical fields of view than the gain and conical field of view of the donor antenna 401. The processor 407 may form each service antenna's beam pattern by providing one or more beam control signals to the respective service antenna 402-404 (e.g., to the service antenna's antenna elements 612) to cause the service antenna 402-404 to form a beam pattern having a desired gain and conical field of view.

Figure 9:
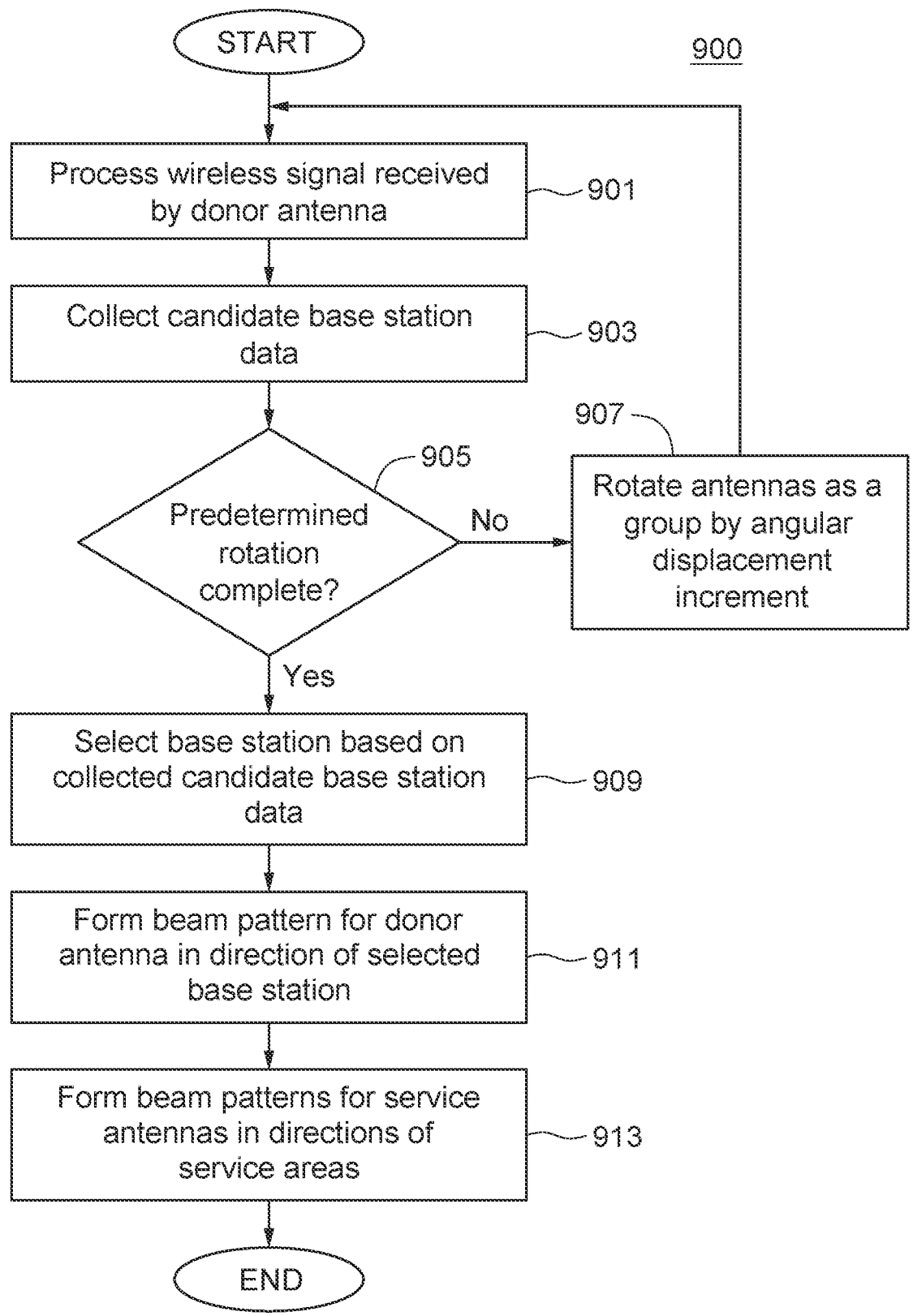
FIG. 9 illustrates an alternative logic flow diagram of steps performed to configure donor and service antennas of the wireless communication node of FIG. 4, in accordance with additional exemplary embodiments of the present disclosure.

FIG. 9 illustrates an alternative logic flow diagram 900 of steps performed to configure the donor and service antennas 401-404 of the wireless communication node 400 of FIG. 4, in accordance with additional exemplary embodiments of the present disclosure. The logic flow steps of FIG. 9 may be performed by one or more processors 407 of the wireless communication node 400 through execution of instructions stored in the node's memory 409.

According to the logic flow of FIG. 9, the processor 407 processes (901) at least one wireless signal received by the donor antenna 401 and collects (903) candidate base station data from the signal. The candidate base station data may be any data necessary to determine (a) a direction from which a wireless signal was received by the donor antenna 401 relative to a starting position for the group of antennas 401-404 and (b) whether the wireless signal meets the base station discovery criteria.

The processor 407 then determines (905) whether the group of antennas 401-404 have completed a predetermined rotation or angular displacement. When the group of antennas 401-404 has not completed the predetermined angular displacement, the processor 407 rotates (907) the antennas 401-404 as a group by an angular displacement increment, which may be determined based on various factors, including installation location of the wireless communication node 400, use case, quantity and locations of possible signal obstructions, and so forth. In one exemplary embodiment, the angular displacement increment is in a range of five to fifteen degrees in a particular direction (e.g., clockwise or counterclockwise). The processor 407 may perform the rotation by providing one or more actuation control signals to an actuator 408 configured to turn a support structure to which the antennas 401-404 are coupled.

After the antennas 401-404 have been rotated as a group by the angular displacement increment, the processor 407 processes (901) wireless signals, if any, received by the donor antenna 401 and collects (903) additional candidate base station data, if any, from the signal(s). The processor 407 then determines whether the group of antennas 401-404 have completed the predetermined rotation. If not, the rotation, processing, and collection functions of logic flow blocks 907, 901, and 903 continue until the antennas 401-404 have been rotated as a group by the predetermined angular displacement (e.g., 90 degrees, 180 degrees, 270 degrees, 360 degrees, or some other chosen displacement amount). Where the predetermined angular displacement is greater than 180 degrees, the processor 407 may send actuation control signals to the actuator 408 so as to rotate the donor and service antennas 401-404 as a group no greater than 180 degrees in either direction (clockwise or counterclockwise) from a starting position in order to mitigate any twisting of cables that may be connected to the antennas 401-404, an antenna module 405 that includes the antennas 401-404, or a support structure to which the antennas 401-404 are coupled.

After the antennas 401-404 have been rotated as a group by the predetermined angular displacement, the processor 407 selects (909) a base station based on the collected candidate base station data and forms (911) a beam pattern for the donor antenna 401 in the direction of the selected base station (e.g., in the direction from which the wireless signal from the selected base station was received during the candidate base station data collection process). The processor 407 may form the donor antenna's beam pattern by providing one or more beam control signals to the donor antenna 401 (e.g., to the donor antenna's antenna elements 612) to cause the donor antenna 401 to form a beam pattern to achieve a signal strength above a threshold for subsequent signals received from the selected base station.

The processor 407 also forms (913) beam patterns for the service antennas 402-404 to provide wireless coverage to one or more service areas. The beam patterns for the service antennas 402-404 may have substantially less gain and wider conical fields of view than the gain and conical field of view of the donor antenna 401. The processor 407 may form each service antenna's beam pattern by providing one or more beam control signals to the respective service antenna 402-404 (e.g., to the service antenna's antenna elements 612) to cause the service antenna 402-404 to form a beam pattern having a desired gain and conical field of view.

According to another exemplary embodiment in which the wireless communication node 400 includes an alerting mechanism 411, the processor 407 processes a wireless signal received by the donor antenna 401 and determines whether the wireless signal meets or exceeds base station discovery criteria, as discussed above. When the wireless signal does not meet the base station discovery criteria, the processor 407 controls the alerting mechanism 411 to inform a user, such as an installer of the wireless node 400, that the base station discovery criteria has not been met. For example, the processor 407 may send one or more alerting control signals to the alerting mechanism 411 to cause the alerting mechanism 411 to, for example, display a particular color (e.g., red) continuously or for a short period of time, such as 10-60 seconds (e.g., where the alerting mechanism 411 is an LED), or communicate a message (e.g., a "no lock" message) to a mobile application executing on a mobile device possessed by the user (e.g., where the alerting mechanism 411 is a wireless communication module) to inform the user that the base station discovery criteria has not been met.

After sending the alerting control signal(s) to the alerting mechanism 411, the processor 407 may wait (e.g., a predetermined amount of time, such as one to five minutes, or until instructed via the mobile application or otherwise) until the group of antennas 401-404 has been rotated, manually or electronically, by an angular displacement (e.g., in the range of 5 degrees to 45 degrees). For example, a support structure, such as the antenna module 405, to which the antennas 401-404 are coupled may be rotated by the angular displacement thereby rotating all the antennas 401-404 in the group by such angular displacement.

After completing the waiting period, the processor 407 processes another wireless signal received by the donor antenna 401 to determine whether such wireless signal meets the base station discovery criteria. When the newly received signal does not meet the base station discovery criteria, the processor 407 may send one or more alerting control signals to the alerting mechanism 411 to cause the alerting mechanism 411 to inform the user that the base station discovery criteria has not been met and awaits the next angular displacement of the group of antennas 401-404. When the processor 407 determines that a wireless signal received by the donor antenna 401 meets the base station discovery criteria, the processor 407 may send one or more other alerting control signals to the alerting mechanism 411 to cause the alerting mechanism 411 to, for example, display a different color (e.g., green) continuously or for a short period of time, such as 10-60 seconds (e.g., where the alerting mechanism 411 is an LED), or communicate a different message (e.g., a "lock made" or "lock achieved" message) to the mobile application executing on the user's mobile device (e.g., where the alerting mechanism 411 is a wireless communication module) to inform the user that the base station discovery criteria has been met. Additionally, the wireless communication node 400, through operation of the processor 407, may establish a connection with the base station that transmitted the criteria-meeting wireless signal. After or as part of establishing the connection, the processor 407 provides beam control signals to the donor antenna 401 to cause the donor antenna 401 to form a desired beam pattern in a direction of the base station.

In some embodiments, the wireless communication node 200, 400 can further include at least one or more processors (not shown) mounted on a substrate that can further include a communication module or transceiver that enables wireless communication of data and control signals over one or any number of known wireless protocols (LTE, 5G, Wi-Fi, etc.).

The wireless communication node 200, 400 may provide wireless communication capability to any one or more devices having corresponding wireless transceivers. In some cases, for example, using functionality provided by the wireless communication node 200, 400, the electronic components embedded in a wireless communication node 200, 400 are arranged to operate as a Wi-Fi access point. In this way, the electronic components permit one or more mobile devices to access the Internet. Municipalities or other entities may make Internet services available over a determined geographic area (e.g., a neighborhood, a city, an arena, a construction site, a campus, or the like) to remote mobile devices that are in proximity to any one of a plurality of wireless communication nodes 200, 400. For example, if many streetlight fixtures in a neighborhood or city are equipped with a wireless communication device, such as a wireless communication node 200, 400, then Wi-Fi service can be provided to a large number of users. Further, based on seamless communication between a plurality of wireless communication device embodiments, the Wi-Fi service can be configured as a mesh that permits users to perceive constant internet connectivity even when the mobile device is in motion.

In some embodiments, the wireless communication node 200, 400 may monitor one or more sensors or conditions associated with a corresponding streetlight fixture for events. Examples of events can include, but are not limited to, light source failure (e.g., a burned out bulb), light pole tilt, external vibrations, light source temperature, external temperature, power usage, captures of images, motion detection, sound recordings, vehicular or pedestrian traffic, ambient light level, or other information that can be obtained or recorded by the wireless communication node 200, 400.

The wireless communication node 200, 400 can be part of a system or network of streetlight poles, streetlight fixtures, streetlight sources, or the like in a system level deployment controlled by a municipality or other government agency. In other cases, the system may be controlled by a private entity (e.g., private property owner, third-party service contractor, or the like). In still other cases, a plurality of entities may share control of the system of streetlight poles streetlight fixtures, streetlight sources, or the like.

In other embodiments, each wireless communication node 200, 400 may be equipped with communication capabilities, which allows for the monitoring or remote control of a light source of the streetlight fixture or of another utility device. Accordingly, each light source in each streetlight fixture or in a broader context each device in any fixture can be monitored and controlled remotely independently or in combination. In the case of a streetlight fixture, each streetlight fixture can be monitored and/or controlled as an independent light source or in combination with other light sources where the electronic apparatus can serve to provide the wireless (or wired) communication of light control signals and any other information (e.g., packetized data) between wireless communication devices.

As one non-limiting, non-exhaustive example, each wireless communication node 200, 400 may operate as a small cell node, a relay node, or a repeater to provide wireless cellular-based network communication services. A mobile device provisioned by a mobile network operator or carrier can communicate with a wireless communication node 200, 400 in the same or similar manner that a mobile device communicates with a macrocell tower. In at least some cases, an active communication session formed between a wireless communication node 200, 400 and a mobile device may be handed-off to or from another wireless communication node 200, 400 as the mobile device moves into or out from the active range of the wireless communication node 200, 400. For example, a user having an active communication session enabled by a wireless communication node 200, 400 may be in motion, and when the mobile device is in motion, the active communication session may in some cases be automatically and seamlessly handed off and continue via another wireless communication node 200, 400 or via a macrocell tower.

The wireless communication node 200, 400 can be integrated with a light fixture or a light pole and may be formed of any number of materials. The wireless communication node 200, 400 can be arranged as a networking device, but in other embodiments, the wireless communication device is a smart sensor device, a combination device, some other wireless networking device, or some other control device. In some embodiments, the light fixture can include a light source that can be an incandescent light source, a light emitting diode (LED) light source, a high pressure sodium lamp, or any other type of light source.

Again, the wireless communication node 200, 400 is not limited to attaching to a streetlight, but can attach to any number of objects including, but not limited to a light pole, an LED board, a bracket, a street sign, a highway sign, a bus stop shelter, an automated teller machine (ATM), a phone booth, a building, an HVAC unit, a mailbox, a billboard, a light, a parking sign, a stop light, a speed limit sign, a solar cell, a crosswalk sign, a tunnel, a utility box, a water tower, a crane, a radio antenna tower, a store, an awning, a roof, or a parking pay station. In some embodiments, each of these items are identified in a map of a map service so that appropriate modifications can be made with base station selections and beam forming of donor and service antennas.

Note that references to "substrate" or "board" herein may refer to a circuit board, which may be a printed circuit board ("PCB"), including, without limitation, a single sided PCB, a double sided PCB, a multilayer PCB, a rigid PCB, a flex PCB, a hybrid rigid-flex PCB, or a portion of a housing serving as a substrate. As is understood, any of the above circuit boards may include various electronic components coupled to or carried by the circuit boards, including, for example, integrated circuits, integrated circuit chips or dies (including, without limitation, semiconductor chips or dies), wires, transistors, leadframes or pads, antennas, receivers, transmitters, transceivers, or other components. Moreover, each of the electronic components described above may be in electronic communication, either via wires (e.g., to transmit power or signals, among other functionality), or wirelessly to one or more of the other electronic components. Further, it is to be understood that any of the above can be coupled to one or more of the other electronic components of the wireless communication node 200, 400 through one or more known coupling techniques or materials.

Moreover, in some cases, one or more internal or external antennas may be electrically and communicatively coupled to the wireless communication node 200, 400 and integrated into, or mounted onto, various features of an external fixture such as a light pole. In some instances, one or more wires may extend through a light pole to communicatively and electrically couple the wireless communication device and the one or more antennas.

Further, it is to be appreciated that the present disclosure includes methods for forming a wireless communication node, the forming including providing the electronic components in a housing enclosure suitable to be attached to any of the objects describe herein and other like objects, installing the wireless communication device, and connecting the wireless communication device to a power source or other utility line to pass power and data via one or more wires or cables or via a wireless communication channel.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a wireless communication networking device may be described as being mounted "substantially vertical," In these cases, a device that is mounted exactly vertical is mounted along a "Y" axis and a "X" axis that is normal (i.e., 90 degrees or at right angle) to a plane or line formed by a "Z" axis. Different from the exact precision of the term, "vertical," and the use of "substantially" or "about" to modify the characteristic permits a variance of the particular characteristic by up to 30 percent.

The term "include" and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense (e.g., "including, but not limited to").

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity, as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses, or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The various embodiments described above can be combined to provide further embodiments. Aspects of the embodiments can be modified, if necessary to employ concepts of the various patents, applications, and publications to provide further embodiments.

What is claimed is:

1. A wireless communication node comprising:
    a plurality of antennas positioned in a predetermined arrangement about a central axis, the plurality of antennas including a donor antenna and one or more service antennas, the donor antenna being operable to communicate wireless signals with a base station after the base station has been discovered by the wireless communication node, the one or more service antennas being operable to communicate wireless signals in one or more service areas;
    an actuator operable to rotate the plurality of antennas as a group about the central axis in response to one or more control signals;
    one or more processors operable to communicate the one or more control signals to the actuator and process wireless signals received by at least the donor antenna; and
    a memory storing processor-executable instructions that, when executed by the one or more processors, cause the one or more processors to:
        process a first wireless signal received by the donor antenna;
        determine whether the first wireless signal meets base station discovery criteria;
        communicate a first control signal to the actuator when the first wireless signal does not meet the base station discovery criteria, the first control signal causing the actuator to rotate the plurality of antennas as a group by an angular displacement;
        process a second wireless signal received by the donor antenna after the plurality of antennas was rotated as a group by the angular displacement; and
        determine whether the second wireless signal meets the base station discovery criteria.

2. The wireless communication node of claim 1, wherein the processor-executable instructions further cause the one or more processors to:
    communicate a second control signal to the actuator when the second wireless signal does not meet the base station discovery criteria, the second control signal causing the actuator to rotate the plurality of antennas as a group by another angular displacement.

3. The wireless communication node of claim 1, wherein the processor-executable instructions further cause the one or more processors to:
    provide one or more beam control signals to each service antenna of the one or more service antennas to cause the service antenna to form a respective beam pattern to provide wireless coverage to the one or more service areas after a determination that at least one of the first wireless signal and the second wireless signal meets the base station discovery criteria.

4. The wireless communication node of claim 1, wherein the plurality of antennas includes the donor antenna and three service antennas for a total of four antennas, and wherein each of the four antennas is configured substantially orthogonal to a neighboring one of the four antennas.

5. The wireless communication node of claim 1, wherein the processor-executable instructions further cause the one or more processors to:
    provide one or more beam control signals to the donor antenna to cause the donor antenna to form a beam pattern to achieve a signal strength above a threshold for subsequent signals received from the base station after a determination that at least one of the first wireless signal and the second wireless signal meets the base station discovery criteria.

6. The wireless communication node of claim 1, wherein a beam pattern of the donor antenna has a higher gain and a narrower beam width than a gain and a beam width of a beam pattern of a service antenna of the one or more service antennas.

7. The wireless communication node of claim 1, further comprising:
    a support structure defining the central axis, the plurality of antennas being operably coupled to the support structure;
    wherein the actuator is operable to rotate the support structure in response to the one or more control signals.

8. The wireless communication node of claim 7, wherein at least one of the support structure and an antenna module containing the plurality of antennas includes a light pipe that directs ambient light to a photo sensor.

9. The wireless communication node of claim 1, wherein the wireless communication node is constructed to be mountable to a streetlight.

10. The wireless communication node of claim 1, wherein the wireless communication node is a repeater in a radio access network, a relay node in a radio access network, or an integrated access and backhaul (IAB) node in an TAB network.

11. The wireless communication node of claim 1, wherein the processor-executable instructions further cause the one or more processors to:
    communicate an initial control signal to the actuator after detecting that the wireless communication node is powered on, the initial control signal being part of an automatic configuration operation and causing the actuator to rotate the plurality of antennas as a group by predetermined angular displacement increments until completing a predetermined rotation, wherein the first wireless signal and the second wireless signal are received by the donor antenna during the rotation of the plurality of antennas as a group.

12. The wireless communication node of claim 1, wherein the base station discovery criteria includes one or more of a base station identifier, signal strength or other signal quality criteria, channel loading criteria, and bandwidth criteria.

13. A wireless communication node comprising:
    an antenna module including:
        a support structure defining a central axis, and
        a plurality of antennas oriented in a predetermined arrangement about the central axis and coupled to the support structure, the plurality of antennas including a donor antenna and one or more service antennas, the donor antenna being operable to communicate wireless signals with a base station after the base station and the wireless communication node have established a connection, the one or more service antennas being operable to communicate wireless signals to one or more service areas;

an actuator operable to rotate the support structure about the central axis in response to one or more control signals;

one or more processors operable to communicate the one or more control signals to the actuator and process wireless signals received by at least the donor antenna; and a memory storing processor-executable instructions that, when executed by the one or more processors, cause the one or more processors to:
  process a first wireless signal received by the donor antenna;
  determine whether the first wireless signal meets base station discovery criteria to enable the connection with the base station;
  communicate a first control signal to the actuator when the first wireless signal does not meet the base station discovery criteria, the first control signal causing the actuator to rotate the support structure by an angular displacement;
  process a second wireless signal received by the donor antenna after rotation of the support structure by the angular displacement; and
  determine whether the second wireless signal meets the base station discovery criteria.

14. The wireless communication node of claim 13, wherein the processor-executable instructions further cause the one or more processors to:
  communicate a second control signal to the actuator when the second wireless signal does not meet the base station discovery criteria, the second control signal causing the actuator to rotate the support structure by another angular displacement.

15. The wireless communication node of claim 13, wherein each of the one or more service antennas comprises an array of antenna elements configured into a phased antenna array and wherein the processor-executable instructions further cause the one or more processors to:
  provide beam control signals to the phased antenna array to cause the phased antenna array to form a desired beam pattern directed to a service area.

16. The wireless communication node of claim 13, wherein the plurality of antennas includes the donor antenna and three service antennas for a total of four antennas, and wherein each of the four antennas is configured substantially orthogonal to a neighboring one of the four antennas.

17. The wireless communication node of claim 13, wherein the processor-executable instructions further cause the one or more processors to:
  provide beam control signals to the donor antenna to cause the donor antenna to form a desired beam pattern in a direction of the base station when at least one of the first wireless signal and the second wireless signal meet the base station discovery criteria.

18. The wireless communication node of claim 13, wherein the support structure includes a light pipe that directs ambient light to a photo sensor positioned in an electronic device to which the antenna module is attached.

19. A wireless communication node comprising:
  a plurality of antennas positioned in a predetermined arrangement about a central axis, the plurality of antennas including a donor antenna and one or more service antennas, the donor antenna being operable to communicate wireless signals with a base station after the base station has been discovered by the wireless communication node, the one or more service antennas being operable to communicate wireless signals in one or more service areas;

an actuator operable to rotate the plurality of antennas as a group about the central axis in response to one or more control signals;

one or more processors operable to communicate the one or more control signals to the actuator and process wireless signals received by at least the donor antenna; and a memory storing processor-executable instructions that, when executed by the one or more processors, cause the one or more processors to:
  communicate at least one control signal to the actuator to cause the actuator to rotate the plurality of antennas as a group in angular displacement increments until completing a predetermined angular rotation;
  at each angular displacement increment, process one or more wireless signals received by the donor antenna to collect candidate base station data;
  select a base station to which to communicate based on the candidate base station data; and
  provide beam control signals to the donor antenna to cause the donor antenna to form a desired beam pattern in a direction of the selected base station.

20. The wireless communication node of claim 19, wherein the candidate base station data for the selected base station meets base station discovery criteria.

21. The wireless communication node of claim 19, wherein the processor-executable instructions further cause the one or more processors to:
  provide beam control signals to each service antenna of the one or more service antennas to cause the service antenna to form a desired beam pattern directed to a service area of the one or more service areas.

22. A method for configuring a plurality of antennas of a wireless communication node for operation in a wireless communication system that includes at least one base station and the wireless communication node, the plurality of antennas including a donor antenna and a plurality of service antennas configured in a predetermined arrangement about a central axis, the method comprising:
  processing a first wireless signal received by the donor antenna;
  determining whether the first wireless signal meets base station discovery criteria;
  when the first wireless signal does not meet the base station discovery criteria, rotating the plurality of antennas as a group about the central axis by an angular displacement;
  after rotation of the plurality of antennas as a group, processing a second wireless signal received by the donor antenna;
  determining whether the second wireless signal meets the base station discovery criteria; and
  when the second wireless signal meets the base station discovery criteria, establishing a wireless connection with a base station that transmitted the second wireless signal.

23. The method of claim 22, further comprising:
  forming a beam pattern for the donor antenna to achieve signal strength above a threshold for subsequent signals received from the base station; and forming respective beam patterns for the plurality of service antennas to provide wireless coverage to one or more service areas.

24. The method of claim 22, further comprising:
when the second wireless signal does not meet the base station discovery criteria, rotating the plurality of antennas as a group about the central axis by another angular displacement.

25. A method for configuring a plurality of antennas of a wireless communication node for operation in a wireless communication system that includes at least one base station and the wireless communication node, the plurality of antennas including a donor antenna and a plurality of service antennas configured in a predetermined arrangement about a central axis, the method comprising:
rotating the plurality of antennas as a group in angular displacement increments until completing a predetermined angular displacement;
at each angular displacement increment, processing one or more wireless signals received by the donor antenna to collect candidate base station data;
selecting a base station to which to connect based on the candidate base station data; and
after selecting the base station based on the candidate base station data, establishing a wireless connection with the base station.

26. The method of claim 25, further comprising:
forming a beam pattern for the donor antenna in a direction of the base station; and
forming respective beam patterns for the plurality of service antennas to provide wireless coverage to one or more service areas.

27. The method of claim 25, wherein the candidate base station data includes at least one of base station identifier, signal quality, channel loading, signal strength, and bandwidth.

* * * * *